United States Patent [19]

Schneider

[11] Patent Number: 5,201,502

[45] Date of Patent: Apr. 13, 1993

[54] APPARATUS FOR CLAMPING WORKPIECES WHICH HAVE TO BE MACHINED BY A MACHINE TOOL

[75] Inventor: Rudolf Schneider, Stansstad, Switzerland

[73] Assignee: Erowa AG, Reinach, Switzerland

[21] Appl. No.: 751,158

[22] Filed: Aug. 28, 1991

Related U.S. Application Data

[63] Continuation-in-part of Ser. No. 534,527, Jun. 6, 1990, abandoned.

[30] Foreign Application Priority Data

Jun. 10, 1989 [DE] Fed. Rep. of Germany ....... 3919078

[51] Int. Cl.$^5$ ............................................. B25B 1/24
[52] U.S. Cl. ..................................... 269/43; 269/221; 269/266
[58] Field of Search ............... 269/111, 118, 119, 120, 269/121, 203, 287, 55, 56, 266, 243, 221, 219

[56] References Cited

U.S. PATENT DOCUMENTS

| | | | |
|---|---|---|---|
| 1,464,389 | 8/1923 | Lancaster | 269/221 |
| 4,027,866 | 6/1977 | Ruggiero | 269/243 |
| 4,030,717 | 6/1977 | Serlovsky | 269/118 |
| 4,330,921 | 5/1982 | White | 269/118 |
| 4,427,191 | 1/1984 | Hess | 269/221 |
| 4,752,063 | 6/1988 | Nagy | 269/266 |

FOREIGN PATENT DOCUMENTS

| | | | |
|---|---|---|---|
| 1195931 | 5/1959 | France | 269/118 |
| 30513 | of 1897 | United Kingdom | 269/266 |

Primary Examiner—Robert C. Watson
Attorney, Agent, or Firm—Tarolli, Sundheim & Covell

[57] ABSTRACT

An apparatus for clamping workpieces which have to be machined by a machine tool. The apparatus comprises a rectangular frame including two longitudinal frame members and two transverse frame members. Clamping means are provided to fix the workpieces to be machined to said rectangular frame. The clamping means comprise at least one auxiliary frame which is removably inserted in said rectangular frame. Each of the auxiliary frames includes two clamping bars which can be adjustably connected to each other and the ends thereof being adapted to be connected to the longitudinal frame members of the rectangular frame such that they are adjustable in the longitudinal direction of the longitudinal frame. The clamping bars comprise a plurality of continuous threaded bores running essentially perpendicular to the clamping bars, said bores being enlarged to a predetermined nominal diameter and said bores being adapted to selectively receive a clamping screw.

19 Claims, 4 Drawing Sheets

APPARATUS FOR CLAMPING WORKPIECES WHICH HAVE TO BE MACHINED BY A MACHINE TOOL

This is a continuation-in-part of copending application(s) Ser. No. 07/534,527 filed on June 6, 1990, abandoned.

BACKGROUND OF THE INVENTION

1. Field of the Invention

The present invention refers to an apparatus for clamping workpieces which have to be machined by a machine tool, the clamping apparatus comprising a rectangular frame means including two longitudinal frame members and two transverse frame members, and clamping means adapted to fix the workpieces to be machined to the rectangular frame.

Further, the invention refers to a clamping bar adapted to be used in an apparatus for clamping workpieces which have to be machined by a machine tool.

2. Prior Art

If a workpiece is to be machined by means of a machine tool, the workpiece has to be fixed or clamped in a suitable manner to the worktable of the machine tool or within the working area of the machine tool. It is well known in the prior art to provide the worktable of the machine tool with undercut grooves which are adapted to receive displaceable clamping bolts. By means of such clamping bolts and additionally by means of hoop-shaped fasteners a workpiece to be machined can be fixed to the worktable of the machine tool. Such a clamping method is cumbersome and time-consuming and often not suitable for small workpieces.

Furthermore, a clamping apparatus is known which comprises a frame provided with clamping members. Usually, according to a well known embodiment, one side of the frame is in the form of a stationary clamping jaw, and a further, displaceable jaw is provided which is under the influence of one or several clamping screws, spindles or the like. Thus, the workpiece to be clamped can be fixed between the stationary and the displaceable jaw.

A main drawback of such a known clamping apparatus is that only one single or several workpieces having exactly identical size can be clamped. Another drawback is that such a clamping frame comprising a fixed and a displaceable jaw, if it is to be used for the clamping of big workpieces or a plurality of identically sized small workpieces, is either to flexible since it resiliently deforms during clamping of the workpiece and workpieces, respectively, or is extraordinarily bulky and heavy if it is to be designed with the required rigidity.

In many applications, particularly if a workpiece has to be machined by wire erosion, it is of paramount importance that the clamping frame be designed to be open such that the erosion wire can pass through the clamping frame. This request renders it even more difficult to design such a clamping frame such that it posses the required rigidity without being too bulky and heavy.

OBJECTS OF THE INVENTION

It is an object of the invention to provide a clamping apparatus for clamping workpieces which have to be machined by a machine tool which is light and manageable, but simultaneously presents an extraordinary high resistance against resilient deformation during the clamping of one or more workpieces.

It is a further object of the invention to provide a clamping apparatus for clamping workpieces which have to be machined by a machine tool by means of which, at will, either single big workpieces can be reliably and accurately clamped, even if they have irregular shape, or a plurality of small workpieces, even if they have different size.

It is a still further object of the invention to provide a clamping apparatus for clamping workpieces which have to be machined by an electro erosive process using a wire as erosion electrode by means of which, at will, either single big workpieces can be reliably and accurately clamped, even if they have irregular shape, or a plurality of small workpieces, even if they have different size.

SUMMARY OF THE INVENTION

In order to meet these and other objects, according to a first aspect, the invention provides an apparatus for clamping workpieces which have to be machined by a machine tool. The apparatus of the invention comprises, in a first general embodiment, a rectangular frame including two longitudinal frame members and two transverse frame members, and clamping means adapted to fix the workpieces to be machined to said rectangular frame.

The clamping means comprise at least one auxiliary frame which is removably inserted in said rectangular frame. Each of said auxiliary frames includes two clamping bars which can be adjustably connected to each other. The ends thereof are adapted to be connected to the longitudinal frame members of said rectangular frame such that they are adjustable in the longitudinal direction of said longitudinal frame members.

The clamping bars comprise a plurality of first bores running essentially parallel to the longitudinal frame members when the clamping bars are connected to the longitudinal frame members, and said bores are adapted to selectively receive a clamping screw.

According to a second aspect of the invention, an apparatus for clamping workpieces which have to be machined by a machine tool is provided. In a second general embodiment, the apparatus comprises a rectangular frame including two longitudinal frame members and two transverse frame members, and clamping means adapted to fix said workpieces to be machined to the rectangular frame.

The clamping means comprise at least one auxiliary frame which is removably inserted in the rectangular frame. Each of said auxiliary frames includes two clamping bars which can be adjustably connected to each other. The ends thereof can be connected to said longitudinal frame members of said rectangular frame such that they are adjustable in the longitudinal direction of the longitudinal frame members.

The clamping bars comprise a plurality of continuous threaded bores running essentially perpendicular to the clamping bars, said bores being enlarged to a predetermined nominal diameter and said bores being adapted to selectively receive a clamping screw.

Such a design, either according to the first or the second aspect of the invention, provides for the clamping of workpieces between two clamping bars which are roughly adjusted to the desired distance, i.e. to the width or length of the workpiece to be clamped. Thereafter, the clamping bars are provisionally fixed at their both ends to the two longitudinal frame members of the rectangular frame. The real clamping of the workpiece or of the plurality of workpieces thereby is effected by means of the auxiliary frame or frames in a place which is optimally suited therefore such that the rectangular main frame is not subjected to any clamping forces.

The invention further provides a clamping bar adapted to be used in an apparatus according to the invention for clamping workpieces which have to be machined by a machine tool, in which said clamping bar comprises a plurality of continuous threaded bores running essentially perpendicular to said clamping bar, said bores being enlarged to a predetermined nominal diameter.

The continuous threaded bores are in a position to perform three different functions:
1. In order to avoid a bending of the clamping bars, two adjacent bores of two cooperating clamping bars located immediately besides the workpiece to be clamped can be provided with a continuous threaded bolt which is loosely inserted into the aligned bores and which is locked by means of a threaded nut.
2. Some of the threaded bores can be provided with stud screws to be clamped against the workpiece or workpieces received between the two clamping bars. In this way, it is possible to clamp irregularly formed workpieces or workpieces with different dimensions.
3. Some of the threaded bores can be provided with cylindrically shaped stop bars on which or against which the workpiece or the workpieces rests and rest, respectively. This measure is especially favourable if a plurality of identical workpieces has to be clamped in the clamping apparatus of the invention in the same position one after the other one.

Further embodiments of the apparatus of the invention are characterized in the claims 2 to 19.

BRIEF DESCRIPTION OF THE DRAWINGS

In the following, two preferred embodiments of the apparatus of the invention will be further described, with reference to the accompanying drawings, in which.

DETAILED DESCRIPTION OF THE PREFERRED EMBODIMENTS

Figure 1:
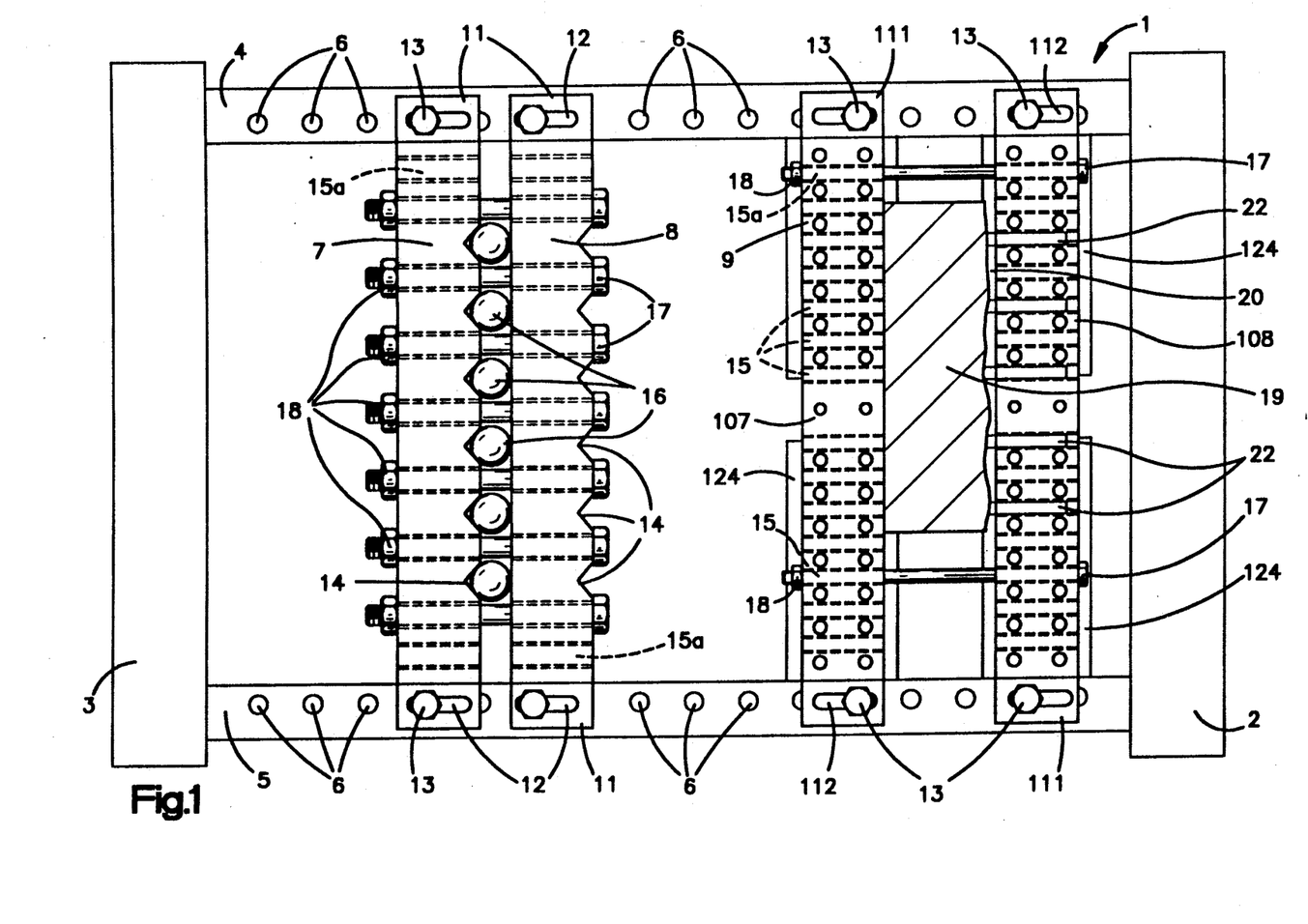
FIG. 1 shows a top view of a first embodiment of the clamping apparatus of the invention with several workpieces clamped therein.

According to the schematic view shown in FIG. 1, a rectangular frame is provided which is generally designated with reference numeral 1. The rectangular frame 1 is fastened to the (not shown) work table of a machining tool by (not shown) fixing means. The rectangular frame 1 comprises two transverse frame members 2 and 3 as well as two longitudinal frame members 4 and 5; the frame members 2 and 3 and the frame members 4 and together form a rigid rectangular frame structure. The two longitudinal frame members 4 and 5 are provided with threaded bores 6 equidistantly arranged in a row extending along the length of the frame members 4 and 5; said threaded bores 6 run in a direction perpendicular to the plane of the rectangular frame 1.

In the embodiment shown in FIG. 1, the rectangular frame 1 is provided, on the one hand, with two clamping bars 7 and 8 and, on the other hand, with two clamping bars 107 and 108. The design of these clamping bars is shown in detail in FIGS. 2 to 4, and 6 and 7, respectively, whereby, as an example, the clamping bar 7 is shown in a lateral view in FIG. 2 and in a bottom view in FIG. 3 and in a partial sectional view in FIG. 4; the clamping bar 107, as an example, is shown in detail in FIGS. 6 to 8.

Figure 2:
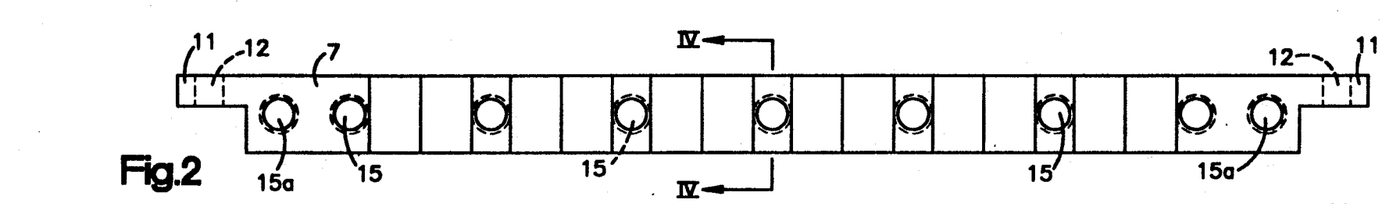
FIG. 2 shows a lateral view of a clamping bar according to a first embodiment.
Figures 3, 4, 8:
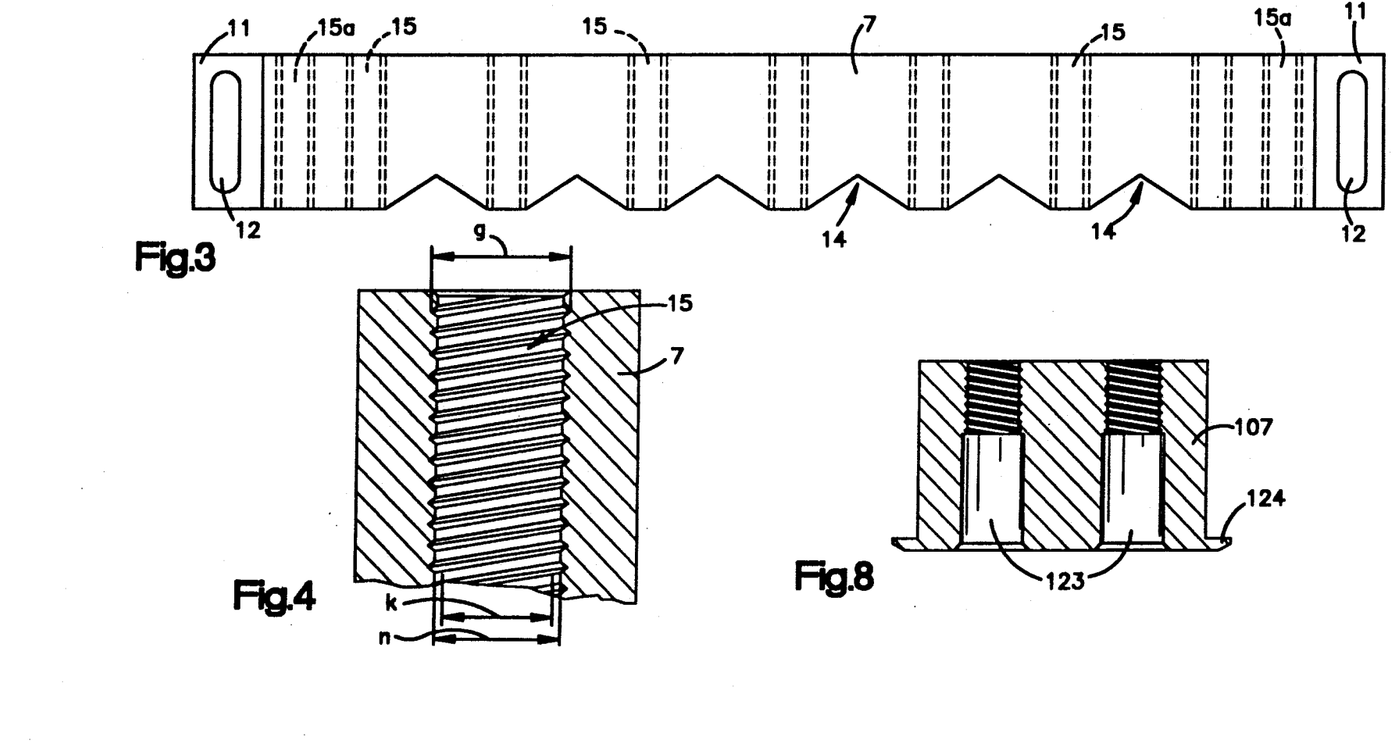
FIG. 3 shows a bottom view of the clamping bar of FIG. 2.
FIG. 4 shows a partial sectional view of the clamping bar of FIG. 2, seen along the line IV—IV in FIG. 2.
FIG. 8 shows a partial sectional view of the clamping bar of FIG. 6, seen along the line VIII—VIII in FIG. 7.

First, the following description of the clamping bars particularly refers to the clamping bar 7. However it is understood that the following description also refers to the design of the clamping bar 8.

The clamping bar 7 is constituted by a longitudinal bar member made of steel and having essentially rectangular cross section. Both ends of the clamping bar 7 are provided with a flattened extension 11 having less height dimension than the clamping bar itself. The length of the clamping bar 7 without the extensions 11 corresponds to the inner width of the rectangular frame 1, measured between the inner faces of the longitudinal frame members 4 and 5. The size of the extensions 11 is such that they at least partially cover the top faces of the longitudinal frame members 4 and 5 which are provided with the threaded bores 6. The clamping bar 7 being positioned in the rectangular frame 1, the extensions 11 rest on the top surfaces of the longitudinal frame members 4 and 5.

The extensions 11 are provided with longitudinal slits 12 running transversely with respect to the clamping bar 7. The design and position of said slits 12 is such that they lay over the threaded bores 6 in the longitudinal frame members 4 and 5 when the clamping bar 7 is positioned in the rectangular frame 1. The length of the slits 12 is somewhat greater than the distance between two adjacent threaded bores 6 such that each clamping bars 7 and 8 can be inserted into and fixed to the rectangular frame 1 at any voluntary position; thereby, the clamping bars can be positioned such that they run parallely to the transverse frame members 2 and 3. As can be further seen from FIG. 1, screws 13 are provided which penetrate the slits 12 and which are screwed into the threaded bores 6 in order to fix the clamping bars 7 and 8 in a desired position.

One of the longitudinal head faces of the clamping bar 7 is provided with a plurality of equidistantly positioned prismatic recesses 14. Between said recesses 14 a small plain portion of the longitudinal head face of the clamping bar 7 is provided. Furthermore, the clamping bar 7 comprises a plurality of bores 15 running parallel to the plane of the rectangular frame 1 and extending transversely the the length of the clamping bar 7. These bores 15 are located in said small plain portions of the longitudinal head face of clamping bar 7, between the aforementioned prismatic recesses 14. Finally, additional bores 15a can be provided near to the two end portions of the clamping bar 7 and close to the extensions 11.

The design of the bores 15 and 15a, respectively, can be seen from FIG. 4. Basically, the bores 15 and 15a are standard threaded bores: however, these standard threaded bores are enlarged to a predetermined nominal value n. Preferably, this nominal value n has a size which is essentially the mean value between the core bore diameter k and the nominal thread diameter g. In the example shown in FIG. 4, the threaded bores 15 and 15a, respectively, are provided with a metric M-10-thread, the nominal thread diameter thereof being 10 mm. The core bore diameter of a M-10-thread is approximately 8.2 mm. Thus, the nominal value to which the threaded bores 15 and 15a, respectively, are enlarged, amounts to approximately 9 mm.

Such a design allows to use the threaded bores 15 and 15a, respectively, for three different purposes:
1. It is possible to screw M-10-screws or M-10-bolts into the bores 15 and 15a, respectively, whereby these screws or bolts are fixed against axial displacement.
2. It is possible to insert cylindrical bars having a diameter of 9 mm into the bores 15 and 15a, respectively, which can be axially displaced, but which are received in said bores reliably and essentially without axial clearance.
3. Screws or threaded bolts having a M-8-thread can be inserted into the bores 15 and 15a, respectively, without being fixed against axial displacement.

Coming back to FIG. 1, the advantages of the aforementioned design will be explained further. As a first example, six cylindrical workpieces 16 have to be clamped in the rectangular frame 1 such that their axes extend perpendicularly to the plane of the rectangular frame 1. For this purpose, the two clamping bars 7 and 8 are used in an orientation as shown in FIG. 1. The workpieces 16 align with the prismatic recesses 14 of the clamping bar 7 and, thus, are equidistantly positioned. The clamping bar 7 can be fixed to the rectangular frame 1 in any desired position by means of the screws 13. Then, the second clamping bar 8 is inserted into the rectangular frame 1, is displaced until it rests on the workpieces 16 and is slightly fixed to the longitudinal frame members 4 and 5 in such a manner that it can be further displaced in the direction of the extension of the longitudinal frame members 4 and 5.

Now, all aligned pairs of threaded bores 15 of the two clamping bars 7 and 8 are provided with threaded bolts 17 and secured each with a nut 18. The nuts 18 are successively tightened in turn with the result that the clamping bar 8 which is but loosely fixed to the longitudinal frame members 4 and 5 is displaced towards the clamping bar 7 so as to clamp the workpieces 16 between the prismatic recesses 14 of the clamping bar 7 and the plain longitudinal head face of the clamping bar 8 directed towards the clamping bar 7. As soon as the workpieces 16 are securely clamped between the two clamping bars 7 and 8, the two fixing screws 13 of the clamping bar 8 can also be tightened.

Due to the fact that a threaded bolt 17 is provided directly besides each of the workpieces 16, any elastic deformation of the clamping bars 7 and 8 is avoided during the clamping thereof and all workpieces 16 are reliably clamped in the desired position.

As a second example, a hexaedral workpiece 19 shall be positioned and clamped between two clamping bars 107 and 108. One surface 20 of the hexaedral workpiece 19 is not plain and has an undefined shape. For this purpose, the clamping bar 107 is inserted into the rectangular frame 1 in a suitable position and fixed to the two longitudinal frame members 4 and 5 by means of the screws 13. Thereafter, the second clamping bar 108 is loosely inserted into the rectangular frame 1 with a certain distance to the clamping bar 107, such distance being somewhat more than the greatest size of the workpiece 19 in transverse direction.

Figure 6:
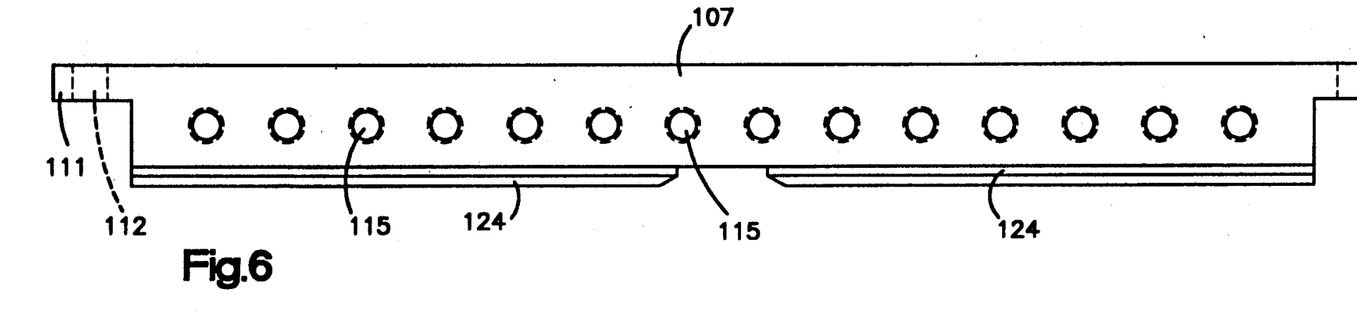
FIG. 6 shows a lateral view of a clamping bar according to a second embodiment.
Figure 7:
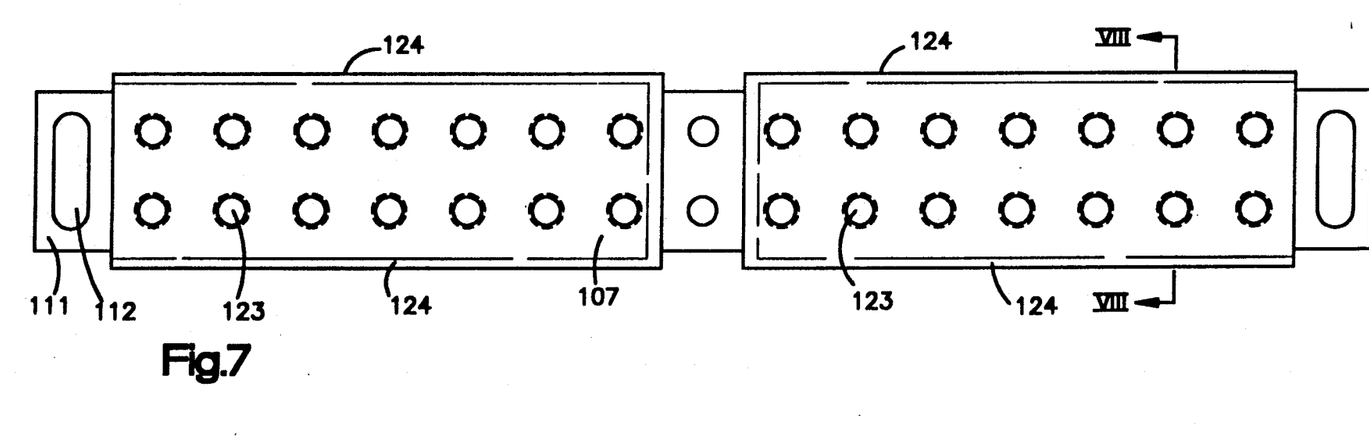
FIG. 7 shows a bottom view of the clamping bar of FIG. 6.

The two clamping bars 107 and 108 comprise support protrusions 124 as can also be seen from FIGS. 6 and 7, running along the lower edge of the clamping bars 107 and 108.

In a next step, the workpiece 19 is put on the support protrusions 124 and between the two clamping bars 107 and 108 thereby, the height position and the parallel orientation with reference to the plane of the rectangular frame is fixed. Thereafter, the clamping bar 108 is displaced towards the surface 20 of the workpiece 19 such that a small clearance between said surface 20 and the facing surface of the clamping bar 108 is maintained. Now, the clamping bar 108 is loosely fixed to the two longitudinal frame members 4 and 5 of the rectangular frame 1 by means of two screws 13. As a next step, two M-8-threaded bolts 17 are inserted into those pairs of bores 15 and 15a, respectively, which are next to the ends of the workpiece 19, and each threaded bolt 17 is provided with a nut 18 which is tightened by hand such that it just rests on the lateral surface of the clamping bar 107.

In the region of the workpiece 19 some bores 15 are left unoccupied. In these left bores 15 of the clamping bar 108 M-10-stud screws 22 are screwed to such an extent that their free surface rests against the irregular surface 20 of the workpiece 19. In this way the workpiece 19 is securely clamped between the stud screws 22 and clamping bar 107. Finally, the fastening screws 13 of the clamping bar 108 can be tightened as well.

Also in this case there is the advantage that the threaded bolts 17 are positioned very close to the ends of the workpiece 19 such that an eventually occuring elastic deformation of the clamping bar 107 and 108 during the clamping operations will be well within very low limits.

Figure 5:
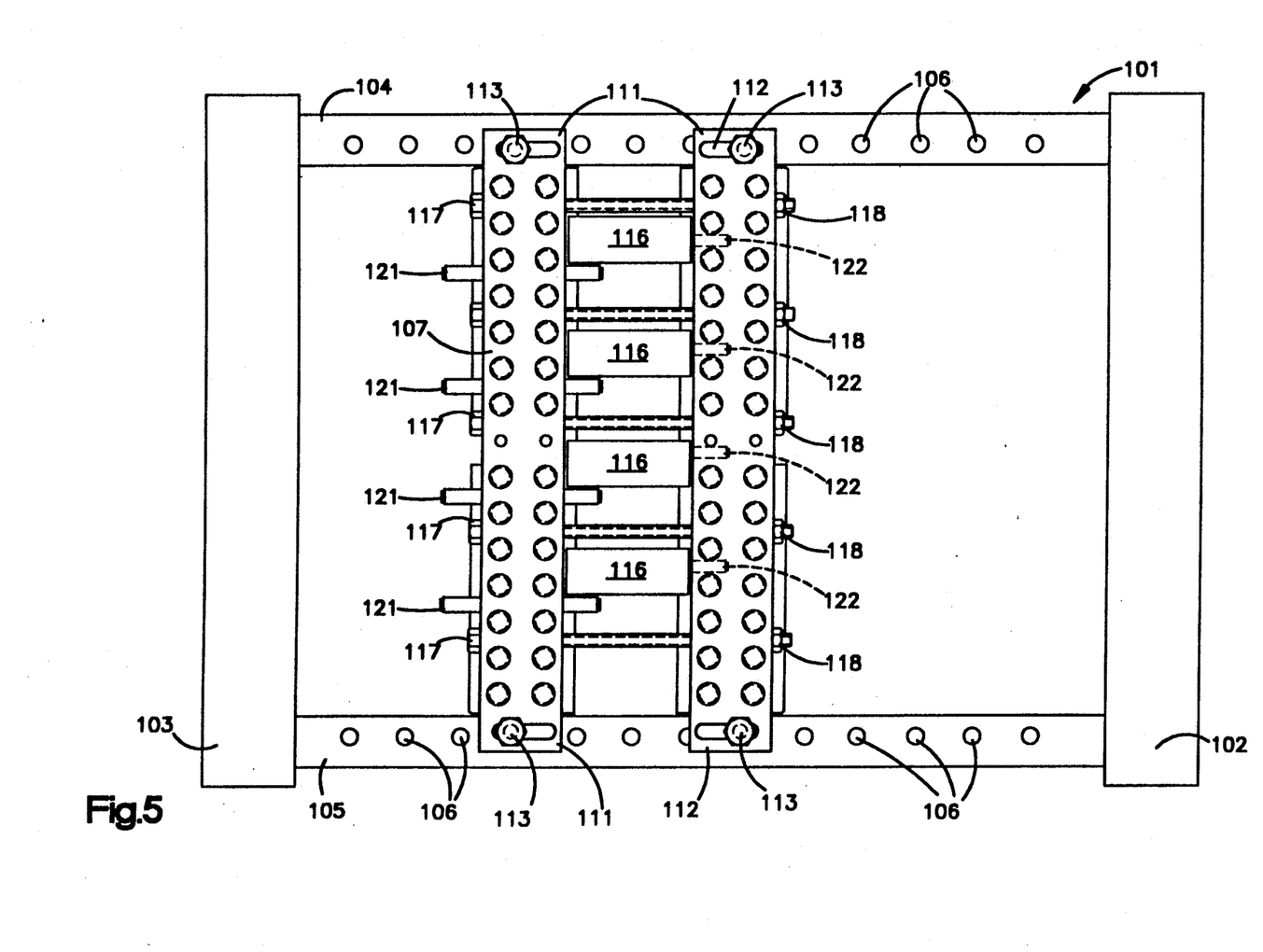
FIG. 5 shows a top view of a second embodiment of the clamping apparatus of the invention with several workpieces clamped therein.

A second embodiment of the apparatus of the invention is shown in FIG. 5. The rectangular frame of the clamping apparatus is generally designated with reference numeral 101. Again, the rectangular frame 101 is fixed to the (not shown) worktable of a machining tool by means of suitable fixing elements (not shown). The rectangular frame 101 comprises two transverse frame members 102 and 103 as well as two longitudinal frame members 104 and 105 which together form a rigid rectangular frame structure. The two longitudinal frame members 104 and 105 are provided with threaded bores 106 equidistantly arranged in a row along the longitudinal extension of the frame members 104 and 105 and running perpendicularly to the plane of the rectangular frame 101.

According to the embodiment shown in FIG. 5, the rectangular frame 101 is equipped with two identically designed clamping bars 107 and 108. The particular design of these two clamping bars 107 and 108 is shown in detail in FIGS. 6 to 8, whereby, as an example, the clamping bar 107 is shown in a lateral view in FIG. 6, in a bottom view in FIG. 7 and in a sectional view in FIG. 8. The clamping bar 107 is constituted by a longitudinal bar member made of steel and having essentially rectangular cross section. Both ends of the clamping bar 107 are provided with a flattened extension 111 having less height dimension than the clamping bar itself. The length of the clamping bar 107 without the extensions 111 corresponds to the inner width of the rectangular frame 101, measured between the inner faces of the longitudinal frame members 104 and 105. The size of the extensions 111 is such that they at least partially cover the top faces of the longitudinal frame members 104 and 105 which are provided with the threaded bores 106. The clamping bar 107 being positioned in the rectangular frame 101, the extensions 211 rest on the top surfaces of the longitudinal frame members 104 and 105.

Extensions 111 are provided with longitudinal slits 112 running transversely with respect to the clamping bar 107. The design and position of said slits 112 is such that they lay over the threaded bores 106 in the longitudinal frame members 104 and 105 when the clamping bar 107 is positioned in the rectangular frame 101. The length of the slits 112 is somewhat greater than the distance between two adjacent threaded bores 106 such that each clamping bar 107 and 108 can be inserted into and fixed to the rectangular frame 101 at any voluntary position; thereby, the clamping bars run parallely to the transverse frame members 102 and 103. As can be further seen from FIG. 5, screws 113 are provided which penetrate the slits 112 and which are screwed into the threaded bores 106 in order to fix the clamping bars 107 and 108 in a desired position.

The clamping bar 107 is provided with a plurality of bores 115 running in the plane of the rectangular frame 101 and extending transversely to the longitudinal extension of the clamping bar 107. These bores 115 are located in the narrow plain portion of the longitudinal surface of the clamping bar 107 and are equidistantly arranged. In addition, further bores 123 are provided which run transversely to the bores 115 in a plane perpendicular to the plane of the rectangular frame 101 the bores 123 are located between two adjacent bores 115. The bores 123, the exact design thereof being evident from FIG. 8, comprise a normal thread and serve to receive (not shown) clamping means. Finally, the clamping bar 107 is provided with support protrusions running along to adjacent edges of the clamping bar 107 which extend parallel to the plane of the rectangular frame 101.

As far as the bores 115 are concerned, the same is true as explained in connection with the bores 15 in the clamping bar 7; reference is made to the explanations in connection with FIG. 4 which analogously apply to the design of the bores 115.

Coming back to the embodiment shown in FIG. 5, in the following, the advantage of this embodiment will be described. As an example, four hexaedral workpieces 116 shall be fixed to and clamped in the rectangular frame 101. For this purpose, the clamping bar 107 is inserted into the rectangular frame 101 in a suitable position and fixed to the two longitudinal frame members 104 and 105 by means of the two fixing screws 113. Thereafter, a second clamping bar 108 is loosely inserted into the rectangular frame 101 in a certain distance to the clamping bar 107; the distance between the clamping bars 107 and 108 approximately corresponds to the relevant size of the workpieces 116. Now, stop bars 121 having a diameter of 9 mm are inserted in suitably located bores 115 of the clamping bar 107 to such an extent that they protrude somewhat into the space between the clamping bars 107 and 108.

As a next step, the workpieces 116 can be inserted into the rectangular frame 101 between the two clamping bars 107 and 108 and between the stop bars 121; thereby the workpieces 116 rest on the support protrusions with the result that the height position and the mutual distance between the workpieces is fixed. Thereafter, the clamping bar 108 is displaced towards the workpieces 116 until there is a small clearance between the front face of the workpiece 116 and the opposite frontface of the clamping bar 108. The clamping bar 108 now can be loosely fixed to the longitudinal frame members 104 and 105 of the rectangular frame 101 by means of the two fixing screws 113.

Thereafter, the pairs of bores 115 in the clamping bars 107 and 108 which are next to the lateral surfaces of the workpieces 116 are equipped each with a threaded bolt 117 of M-8-size, and on each bolt 117 a nut 118 is screwed on and tightened by hand to such an extend that it just rests again the lateral face of the clamping bar 108. Now, four suitably located bores 115 of the clamping bar 108, i.e., bores 115 which open to the front faces of the workpieces 116, are equipped with M-10-stud screws 122 which are tightened such that each workpiece 116 is clamped between the stud screws 122 and the clamping bar 107. Finally, also the fixing screws 113 of the clamping bar 108 can be tightened.

Also with this embodiment, the advantage can be observed that the threaded screw bolts 117 can be placed very close to the side faces of the workpieces 116 with the result that an eventually occurring elastic deformation of the clamping bars 107 and 108 is within very low limits.

It is understood that, in a corresponding manner, a plurality of small workpieces can be clamped one next to the other one which have different width. The difference in width may easily be compensated by screwing the stud screws 122 more or less into the corresponding threaded bore 115.

The rectangular frame 1 and 101, respectively, of the invention, finally equipped with the workpieces to be machined, is extraordinarily rigid and has comparatively low weight, due to the fact that the clamping means (threaded screw bolts 17 and 117, respectively; stud screws 22 and 122, respectively) can always be located directly besides or very close to the workpieces to be clamped. The result is that the clamping bars can be designed relatively narrow and, therefore, light in weight. The same is true for the transverse and longitudinal frame members of the rectangular frame 1 and 101, respectively, since they are not loaded with clamping forces at all, buy only have the function to hold the clamping bars 7 to 10 and 107, 108 respectively, and thereby the workpieces 16, 19, 116, in the desired position. With other words, the real clamping function is fulfilled by an auxiliary frame, constituted by, e.g., a pair of clamping bars and two or more threaded screw bolts, said auxiliary frame being fixed by the screws 13 and 113, respectively, to the main frame.

The clamping apparatus of the invention is very versatile for the clamping of small or big workpieces, of a single workpiece or of several workpieces, or a plurality of different workpieces with irregular shape etc., because only a few basic elements (clamping bars, threaded screw bolts, stud screws, stop bars) are to be used.

What I claim is:

1. An apparatus for clamping a workpiece to be machined by a machine tool, said apparatus comprising:
   rectangular frame means including two longitudinal frame members and two transverse frame members;

clamping means for fixing said workpiece to be machined to said rectangular frame means, said clamping means comprising at least one auxiliary frame means which is removably inserted in said rectangular frame means;

each of said auxiliary frame means including two clamping bars which are adjustable relative to each other in the longitudinal direction of said longitudinal frame members to enable clamping of said workpiece therebetween, said clamping bars defining a plurality of first bores for selectively receiving clamping screw means, said first bores running essentially parallel to said longitudinal frame members when said clamping bars are connected to said longitudinal frame members, each clamping bar having one end releasably connected to one of said longitudinal frame members and an opposite end releasably connected to the other one of said longitudinal frame members;

means for connecting said ends of each clamping bar to said longitudinal frame members; and clamping screw means for, when selectively received in said first bores, providing a clamping force to clamp said workpiece between said clamping bars and to thereby fix said workpiece to said rectangular frame means when said clamping bars are adjusted relative to each other to enable clamping of said workpiece and are connected to said longitudinal frame members.

2. An apparatus for clamping a workpiece to be machined by a machine tool, said apparatus comprising:

rectangular frame means including two longitudinal frame members and two transverse frame members, said longitudinal frame members of said rectangular frame means being provided with a plurality of threaded bores equidistantly arranged in a row and running in a direction which is perpendicular to the plane of said rectangular frame means;

clamping means for fixing said workpiece to be machined to said rectangular frame means, said clamping means comprising at least one auxiliary frame means which is removably inserted in said rectangular frame means;

each of said auxiliary frame means including two clamping bars which are adjustable relative to each other in the longitudinal direction of said longitudinal frame members to enable clamping of said workpiece therebetween, said clamping bars defining a plurality of first bores for selectively receiving clamping screw means, said first bores running essentially parallel to said longitudinal frame members when said clamping bars are connected to said longitudinal frame members, each clamping bar having one end releasably connected to one of said longitudinal frame members and an opposite end releasably connected to the other one of said longitudinal frame members;

means for cooperating with said plurality of threaded bores of said longitudinal frame members for connecting said ends of each clamping bar to said longitudinal frame members; and clamping screw means for, when selectively received in said first bores, providing a clamping force to clamp said workpiece between said clamping bars and to thereby fix said workpiece to said rectangular frame means when said clamping bars are adjusted relative to each other to enable clamping of said workpiece and are connected to said longitudinal frame members.

3. An apparatus according to claim 2, in which said clamping bars comprise flattened end portions which are adapted to rest on said longitudinal frame members equipped with said threaded bores, each of said flattened end portions comprising a slot extending in the direction of said longitudinal frame members equipped with said threaded bores and said slots coinciding with said threaded bores provided in said longitudinal frame members.

4. An apparatus according to claim 1, in which each of said clamping bars has a longitudinal head face which is provided with a plurality of prismatic-shaped recesses.

5. An apparatus according to claim 4, in which some of said first bores provided in said clamping bars are located between adjacent prismatic-shaped recesses.

6. An apparatus for clamping a workpiece to be machined by a machine tool, said apparatus comprising:

rectangular frame means including two longitudinal frame members and two transverse frame members;

clamping means for fixing said workpiece to be machined to said rectangular frame means, said clamping means comprising at least one auxiliary frame means which is removably inserted in said rectangular frame means;

each of said auxiliary frame means including two clamping bars which are adjustable relative to each other in the longitudinal direction of said longitudinal frame members to enable clamping of said workpiece therebetween, said clamping bars defining a plurality of first bores for selectively receiving clamping screw means, said first bores running essentially parallel to said longitudinal frame members when said clamping bars are connected to said longitudinal frame members, each clamping bar having one end releasably connected to one of said longitudinal frame members and an opposite end releasably connected to the other one of said longitudinal frame members;

means for connecting said ends of each clamping bar to said longitudinal frame members; and clamping screw means for, when selectively received in said first bores, providing a clamping force to clamp said workpiece between said clamping bars and to thereby fix said workpiece to said rectangular frame means when said clamping bars are adjusted relative to each other to enable clamping of said workpiece and are connected to said longitudinal frame members;

said clamping bars being provided with a plurality of equidistantly arranged threaded second bores extending perpendicularly to the plane of said rectangular frame means.

7. An apparatus for clamping a workpiece to be machined by a machine tool, said apparatus comprising:

rectangular frame means including two longitudinal frame members and two transverse frame members;

clamping means for fixing said workpiece to be machined to said rectangular frame means, said clamping means comprising at least one auxiliary frame means which is removably inserted in said rectangular frame means;

each of said auxiliary frame means including two clamping bars which are adjustable relative to each other in the longitudinal direction of said longitudinal frame members to enable clamping of said workpiece therebetween, said clamping bars defining a plurality of first bores for selectively receiving clamping screw means, said first bores running essentially parallel to said longitudinal frame members when said clamping bars are connected to said longitudinal frame members, each clamping bar having one end releasably connected to one of said longitudinal frame members and an opposite end releasably connected to the other one of said longitudinal frame members;

means for connecting said ends of each clamping bar to said longitudinal frame members; and clamping screw means for, when selectively received in said first bores, providing a clamping force to clamp said workpiece between said clamping bars and to thereby fix said workpiece to said rectangular frame means when said clamping bars are adjusted relative to each other to enable clamping of said workpiece and are connected to said longitudinal frame members;

each of said clamping bars being provided with support protrusions running along two adjacent edges of the clamping bar, each of said edges extending parallel to the plane of said rectangular frame means.

8. An apparatus for clamping workpiece to be machined by a machine tool, said apparatus comprising:

rectangular frame means including two longitudinal frame members and two transverse frame members;

clamping means for fixing said workpiece to be machined to said rectangular frame means, said clamping means comprising at least one auxiliary frame means which is removably inserted in said rectangular frame means;

each of said auxiliary frame means including two clamping bars which are adjustable relative to each other in the longitudinal direction of said longitudinal frame members to enable clamping of said workpiece therebetween, said clamping bars comprising a plurality of continuous threaded first bores running essentially perpendicular to said clamping bars, said first bores being enlarged to a predetermined nominal diameter and said first bores being adapted to selectively receive clamping screw means, each clamping bar having one end releasably connected to one of said longitudinal frame members and an opposite end releasably connected to the other one of said longitudinal frame members;

means for connecting said ends of each clamping bar to said longitudinal frame members; and clamping screw means for, when selectively received in said first bores, providing a clamping force to clamp said workpiece between said clamping bars and to thereby fix said workpiece to said rectangular frame means when said clamping bars are adjusted relative to each other to enable clamping of said workpiece and are connected to said longitudinal frame members.

9. An apparatus according to claim 8, in which said longitudinal frame members of said rectangular frame means are provided with a plurality of threaded bores equidistantly arranged in a row and running in a direction which is perpendicular to the plane of said rectangular frame means.

10. An apparatus according to claim 9, in which said clamping bars comprise flattened end portions which are adapted to rest on said longitudinal frame members equipped with said threaded bores, each of said flattened end portions comprising a slot extending in the direction of said longitudinal frame members equipped with said threaded bores and said slots coinciding with said threaded bores provided in said longitudinal frame members.

11. An apparatus according to claim 8, in which said threaded first bores in said clamping bars are enlarged to a diameter, the size of which essentially corresponds to the mean value of the nominal diameter of the thread and the core bore diameter of the thread.

12. An apparatus according to claim 8, in which each of said clamping bars has a longitudinal head face which is provided with a plurality of prismatic-shaped recesses.

13. An apparatus according to claim 12, in which some of said threaded first bores provided in said clamping bars are located between adjacent prismatic-shaped recesses.

14. An apparatus according to claim 8, in which said clamping bars are provided with a plurality of equidistantly arranged threaded second bores extending perpendicularly to the plane of said rectangular frame means.

15. An apparatus according to claim 8, in which each of said clamping bars is provided with support protrusions running along two adjacent edges of the clamping bar, each of said edges extending parallel to the plane of said rectangular frame means.

16. An apparatus according to claim 8, in which two parallel running clamping bars are located near each other, some of said threaded first bores of said clamping bars being provided with a stud screw adapted to clamp a workpiece between said two parallely running clamping bars.

17. An apparatus according to claim 8, in which some of said threaded first bores are provided with stop bars projecting out of said threaded first bores.

18. An apparatus according to claim 16, in which there are provided continuous threaded bolts running through predetermined aligned pairs of threaded first bores of said two clamping bars.

19. An apparatus according to claim 8, in which said threaded first bores are enlarged to a predetermined nominal diameter.

* * * * *